(12) United States Patent
Asaka et al.

(10) Patent No.: US 6,765,654 B2
(45) Date of Patent: Jul. 20, 2004

(54) COHERENT LASER RADAR DEVICE

(75) Inventors: Kimio Asaka, Tokyo (JP); Yoshihito Hirano, Tokyo (JP); Takayuki Yanagisawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/296,043

(22) PCT Filed: May 11, 2001

(86) PCT No.: PCT/JP01/03956
§ 371 (c)(1),
(2), (4) Date: Nov. 21, 2002

(87) PCT Pub. No.: WO02/093193
PCT Pub. Date: Nov. 21, 2002

(65) Prior Publication Data
US 2003/0133093 A1 Jul. 17, 2003

(51) Int. Cl.$^7$ .............................. G01C 3/08; G01P 3/36; G01S 13/00
(52) U.S. Cl. ........................ 356/5.09; 356/5.01; 356/28; 342/54
(58) Field of Search .............................. 356/5.01, 5.09, 356/4.01, 28, 28.5; 342/54

(56) References Cited

U.S. PATENT DOCUMENTS

| | | | |
|---|---|---|---|
| 4,902,127 A | | 2/1990 | Byer et al. |
| 5,237,331 A | | 8/1993 | Henderson et al. |
| 5,428,439 A | * | 6/1995 | Parker et al. ............... 356/5.01 |
| 5,767,953 A | * | 6/1998 | McEwan ................... 356/5.01 |
| 5,815,250 A | * | 9/1998 | Thomson et al. .......... 356/5.01 |
| 6,040,898 A | * | 3/2000 | Mrosik et al. ............. 356/5.09 |
| 6,335,701 B1 | | 1/2002 | Fujisaka et al. |
| 6,400,448 B1 | * | 6/2002 | Sugawara et al. ......... 356/5.01 |
| 6,469,778 B2 | | 10/2002 | Asaka et al. |

FOREIGN PATENT DOCUMENTS

| | | |
|---|---|---|
| JP | 5-259561 A | 10/1993 |
| JP | 8-21872 A | 1/1996 |
| JP | 8-304541 A | 11/1996 |
| JP | 10-73661 A | 3/1998 |

* cited by examiner

Primary Examiner—Bernarr E. Gregory
Assistant Examiner—Brian K Andrea
(74) Attorney, Agent, or Firm—Birch, Stewart, Kolasch & Birch, LLP

(57) ABSTRACT

An object of the invention is to obtain a coherent laser radar device that provides one system of a photo detector and eliminates a blind zone, including a pulsed laser that oscillates at a frequency which is identical with or close to an output light of a local light source as a single frequency; a transmission/reception optical system that irradiates a pulsed laser beam from the pulsed laser toward a target as a transmission light and receives a scattered light from the target as a reception light; a light coupling means that couples the output light from the local light source and the reception light; a photo detecting portion that conducts light coherent detection on a coupled light; and a signal processing device that calculates a speed and a distance of a target in accordance with an output of the detection, in which the photo detecting portion comprises: a photo detecting element that conducts the light coherent detection; a microwave switch that changes over a propagation path of an output from the photo detecting element; a microwave amplifier; and a switch control means that changes over the microwave switch so as to transmit a signal before a reference time as a monitor signal and transmit a signal after the reference time as a reception signal with a time at which the pulse light from the pulsed laser has completely passed through the transmission/reception optical system as the reference time.

24 Claims, 13 Drawing Sheets

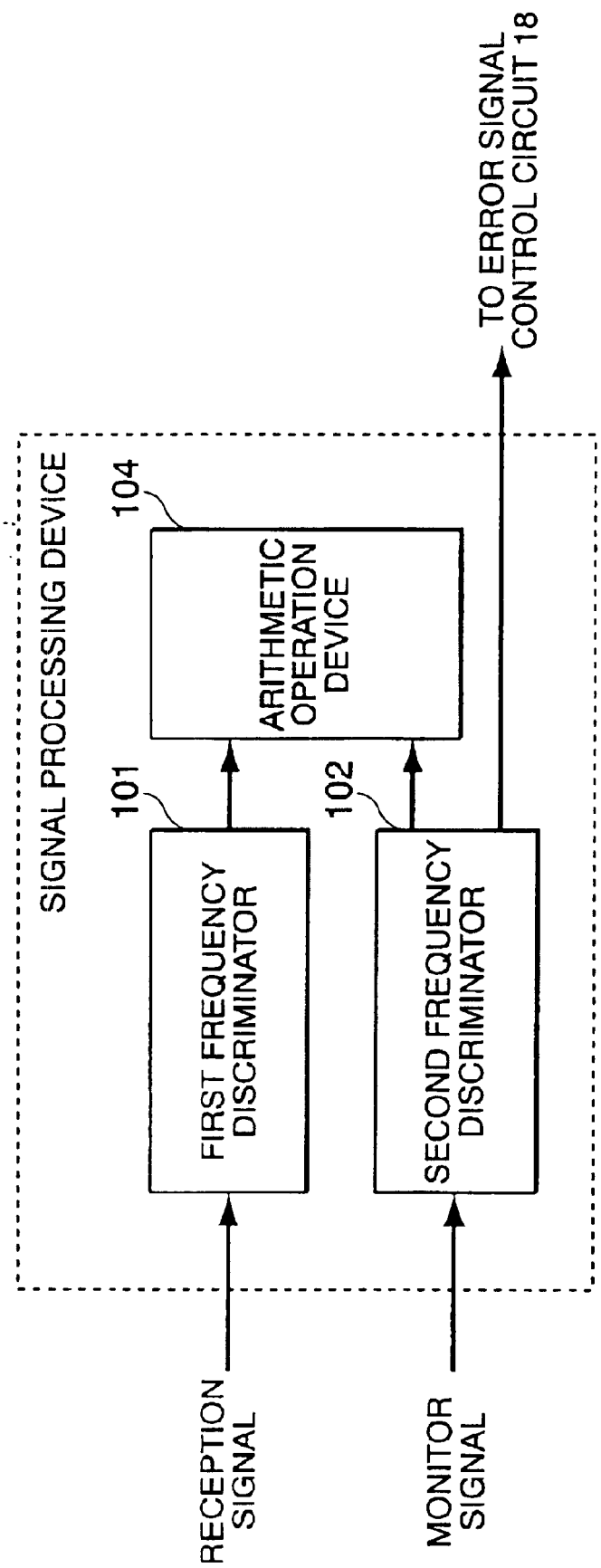

US 6,765,654 B2

COHERENT LASER RADAR DEVICE

COHERENT LASER RADAR DEVICE

This application is the national phase under 35 U.S.C. §371 of PCT International Application No. PCT/JP01/03956 which has an International filing date of May 11, 2001, which designated the United States of America.

TECHNICAL FIELD

The present invention relates to a laser radar device, and more particularly to a coherent laser radar device using a pulsed laser that oscillates at a single wavelength as a light source for the purpose of measuring physical information such as a distance, a velocity, a density distribution or a velocity distribution of a target.

BACKGROUND ART

A coherent laser radar device using a laser beam can measure a wind velocity or a wind velocity distribution even in fine weather because a sufficient scattering intensity is obtained even through aerosol existing in the atmospheres. For that reason, the coherent laser radar device is preferably located at an airport or mounted on an aircraft and expected as a device for detecting a hindrance including an air turbulence.

The coherent laser radar devices are of two types one of which employs a pulsed laser that oscillates at a single frequency as a light source and the other of which employs a CW (continuous wave) laser.

FIG. 9 is a structural diagram showing a laser radar device in which a coherent laser radar device using an injection seeding pulsed laser device as a light source as disclosed in U.S. Pat. No. 5,237,331 B by Sammy W. Henderson et al. is combined with a wavelength synchronizing circuit for stabilizing the wavelength of the laser radar light source as disclosed in JP 10-54760 A by Shoji and Hirano.

The laser radar device shown in FIG. 9 includes a CW laser light source 1 that oscillates at a single frequency, a first optical divider 2 that branches a laser beam 19 from the CW laser light source 1, a frequency shifter 3, an injection seeding pulsed laser 4, a beam splitter 5, a ¼ wavelength plate 6, a telescope 7, a scanning optical system 8, a first optical coupler 9, a photo detecting portion 10, a second optical divider 11, a third optical divider 12, a second optical coupler 13, a signal processing device 16, an adjusting mechanism 17 for a cavity length of the injection seeding pulsed laser 4, and a control circuit 18 for the adjusting mechanism. Reference numeral 20 denotes a seed light from the frequency shifter 3, 21 is a pulsed laser beam from the injection seeding pulsed laser 4, 22 is an optical axis of a transmit/reception light, 23 is a transmission light, 24 is a reception light, 25 is a local light and 26 is a coupled light of the reception light 24 and the local light 25 due to the first optical coupler 9.

Subsequently, the operation of the laser radar device shown in FIG. 9 will be described. The laser beam 19 from the laser light source 1 that oscillates at a single frequency $f_0$ is branched by the first optical divider 2 into two beams one of which forms the local light 25, and the other of which becomes a laser beam that increases in frequency by a frequency $f_{IF}$ by the frequency shifter 3 and is then supplied to the injection seeding pulsed laser 4 as the seed light 20.

The injection seeding pulsed laser 4 conducts the pulse oscillation at the single frequency (single wavelength) in an axis mode having a frequency closest to the seed light 20.

The laser pulse 21 from the injection seeding pulsed laser 4 which is linearly polarized is reflected by the beam splitter 5 through the second optical divider 11. Thereafter, the reflected light is transformed into a circularly polarized light by the ¼ wavelength plate 6 and then irradiated toward a target through the telescope 7 and the scanning optical system 8 as the transmission light 23.

A scattered light from the target is received through a backward path of the transmission light. The reception light 24 becomes a linearly polarized light shifted from a polarization plane of the laser pulse 21 by 90 degrees due to the ¼ wavelength plate 6 and is then transmitted through the beam splitter 5 so as to be guided to the first optical coupler 9. In the first optical coupler 9, the reception light 24 and the local light 25 are coupled together, and the coupled light 26 is supplied to the photo detecting portion 10.

In this example, the photo detecting portion 10 is structured as shown in FIG. 10.

As shown in FIG. 10, the photo detecting portion 10 includes a first photo detector 27 and a second photo detector 28. Each of the first and second photo detectors 27 and 28 is made up of a photodiode that functions as a square-law detector which conducts light coherent detection and a microwave amplifier that electrically amplifies a signal from the photodiode. The microwave amplifier is shown by the combination of a pre-amplifier and a post-amplifier in the figure. A detection output from the first photo detector 27 is outputted to the signal processing device 16 as a reception signal, and a detection output from the second photo detector 28 is outputted to the signal processing device 16 as a monitor signal.

Returning to FIG. 9, the coupled light 26 from the first optical coupler 9 is coherent-detected by the first photo detector 27 of the photo detecting portion 10. A signal from the first photo detector 27 is inputted to the signal processing device 16 as the reception signal. The signal processing device 16 calculates a distance to the target in accordance with an arrival period of time of the reception signal (a period of time since the transmission of the transmission light to the target till the reception of the reception light from the target), analyzes the frequency of the reception signal to obtain a Doppler signal, and extracts the velocity of the target from the Doppler signal.

As described above, the injection seeding pulsed laser 4 is required to monitor a difference in frequency between the pulsed laser beam 21 and the local light 25 in order to obtain an accurate Doppler signal since the injection seeding pulsed laser 4 conducts the pulse oscillation at the single frequency in an axis mode having a frequency closest to the seed light 20. For that reason, after a part of the laser pulse 21 and a part of the local light 25 are extracted as monitor lights from the second and third optical dividers 11 and 12, respectively, and then coupled together by the second optical coupler 13, the coherent detection is conducted by the second photo detector 28 within the photo detecting portion 10a. A signal from the second detector 28 becomes the monitor signal.

In the signal processing device 16, a frequency difference (the frequency of the monitor signal) $f_M$ between the laser pulse 21 and the local light 25 and the oscillation timing of the laser pulse are obtained from the monitor signal. Assuming that the frequency of the local light 25 is $f_0$, the respective frequencies $f_s$, $f_T$, $f_R$, $f_M$ and $f_{sig}$ of the seed light, the laser pulse, the reception light, the monitor signal and the reception signal are represented by the following expressions.

$$f_s = f_0 + f_{IF}$$
$$f_T = f_s + \Delta f$$
$$f_R = f_T + f_d$$
$$f_M = f_{IF} + \Delta f$$
$$f_{sig} = f_M + f_d$$

where $\Delta f$ is a frequency difference between the laser pulse 21 and the seed light 20, and $f_d$ is a Doppler frequency of the target. A difference between the frequency $f_{sig}$ of the reception signal and the frequency $f_M$ of the monitor signal is taken, thereby being capable of obtaining the Doppler frequency $f_d$ of the target.

In order that the injection seeding pulsed laser 4 stably obtains the injection seeding operation, the injection seeding pulsed laser 4 adjusts the cavity length of the pulsed laser by using a piezoelectric element as the adjusting mechanism 17 for the cavity length. The piezoelectric element that functions as the adjusting mechanism 17 of the cavity length is controlled by the control circuit 18. In the signal processing device 16, an error signal based on a value of the frequency difference $f_M$ between the laser pulse 21 and the local light 25 is transmitted to the control circuit 18 from the monitor signal. In the control circuit 18, the cavity length of the pulsed laser 4 is adjusted by the piezoelectric element so that the value of $\Delta f$ is set to be a set value or less, or 0.

In this way, the laser pulse that stably oscillates in a single mode (single wavelength) is obtained.

FIG. 11 is a block diagram showing a structure of a signal processing device 16a as an example of the signal processing device 16. The signal processing device 16a includes a first frequency discriminator 101, a second frequency discriminator 102, a third frequency discriminator 103 and an arithmetic operation device 104.

The first frequency discriminator 101 conducts a frequency analysis upon receiving a reception signal from the first photo detector 27 and extracts a Doppler frequency from a target. The second frequency discriminator 102 conducts the frequency analysis of the monitor signal and obtains the frequency difference $f_M$ between the laser pulse 21 and the local light 25 and the oscillation timing of the laser pulse from the monitor signal. The third frequency discriminator 103 transmits the error signal based on the value of the frequency difference $f_M$ between the laser pulse 21 and the local light 25 to the control circuit 18 from the monitor signal. The arithmetic operation device 104 calculates a distance and a velocity of the target on the basis of an output signal from the first and second frequency discriminators 101 and 102.

In this example, the structure of the frequency discriminator that functions as the first frequency discriminator 101, the second frequency discriminator 102 and the third frequency discriminator 103 includes an A/D converter that converts the reception signal or the monitor signal into a digital signal and a signal processing portion that processes the digital signal converted by the A/D converter into a necessary signal by a frequency analyzing means such as a fast Fourier transform (FFT) as shown in FIG. 12.

Also, as shown in FIG. 13, the frequency discriminator may be made up of an electric filter portion which is made up of one or a plurality of electric filters, and a signal processing portion that conducts a necessary signal processing in accordance with the transmittance of a signal from the electric filter portion.

Also, the signal processing device 16 can employ a signal processing device 16b that incorporates the function of the third frequency discriminator 103 shown in FIG. 11 into the second frequency discriminator 102 shown in FIG. 11, as shown in FIG. 14, and has the same function as that of the signal processing device 16a shown in FIG. 11.

As described above, in the photo detecting portion 10 of the coherent laser radar device using the conventional injection seeding pulsed laser 4 as the light source, the second photo detector 28 for monitoring the oscillation frequency of the injection seeding pulsed laser 4 is disposed in addition to the first photo detector 27 that detects the reception light as shown in the photo detecting portion 10a shown in FIG. 10. In addition, at least two systems for the reception signal, the monitor and so on are prepared for the frequency discriminator as shown in FIGS. 11 and 14.

In the case where the intensity of the monitor light is sufficiently large, a part or the entire microwave amplifier of the second photo detector 28 can be omitted.

Subsequently, an influence of an internal reflection light of the coherent laser radar device using a pulsed laser light source and a coaxial transmission/reception optical system as shown in FIG. 9 will be described.

In FIG. 9, the beam splitter 5, the ¼ wavelength plate 6, the telescope 7 and the scanning optical system 8 are of the coaxial transmission/reception optical system that makes the optical axes 22 of the transmit/reception lights substantially coincide with each other.

In the coherent laser radar device using the coaxial transmission/reception optical system of this type, the internal reflection lights from the optical elements that constitute the coaxial transmission/reception optical system reach the photo detecting portion 10 through the same path as that through which the reception light passes. In particular, since the internal reflection lights from the telescope 7 and the scanning optical system 8 pass through the beam splitter 5 as a reception side, the influence of the internal reflection light is large. As usual, the attenuation of reflection of the telescope 7 and the scanning optical system 8 is about 60 to 70 dB. On the contrary, the attenuation of reflection of the reception light from aerosol contained in the atmosphere exceeds 100 dB.

In order to conduct a high-precision measurement, the microwave amplifier which is made up of the pre-amplifier and the post-amplifier of the first photo detector 27 within the photo detecting portion 10a shown in FIG. 10 is required to amplify the reception signal up to about a degree suitable for the maximum sampling amplitude of the first frequency discriminator 101. Since the reception light is slight, the microwave amplifier of the first photo detector 27 has a high gain. Since the internal reflection light is much larger in power than the reception light, the internal reflection light induces the saturation of the microwave amplifier in the first photo detector 27. Since the linear amplification of the signal is not conducted until the microwave amplifier is restored since the microwave amplifier is saturated, the measurement cannot be conducted. As usual, it takes several $\mu s$ until the influence of such an internal reflection light is eliminated. For that reason, a "blind zone" where the short distance of several hundreds of m from the device cannot be measured occurs.

As described above, the coherent laser radar device using the conventional injection seeding pulsed laser 4 shown in FIG. 9 as the light source and also using the coaxial transmission/reception optical system suffers from the following drawbacks.

1. In order to monitor the oscillation frequency of the injection seeding pulsed laser 4, the photo detector for monitoring is disposed in addition to the photo detector that detects the reception light, resulting in the complicated photo detecting portion.

2. Likewise, at least two systems for the reception signal and the monitor are disposed for the frequency discriminator with the result that the signal processing device is complicated.

3. The wide "blind zone" where the measurement cannot be conducted over the short distance of several hundreds of m from the device occurs due to the influence of the internal reflection light of the transmission/reception optical system.

The present invention has been made to eliminate the above-described problems, and therefore an object of the present invention is to provide a coherent laser radar device using an injection seeding pulsed laser as a light source and also using a coaxial transmission/reception optical system in which a photo detector is of one system and the blind zone can be eliminated.

DISCLOSURE OF THE INVENTION

In order to achieve the above-mentioned object, according to the present invention, there is provided a coherent laser radar device, comprising: a local light source that oscillates at a single frequency; a pulsed laser that oscillates at a frequency which is identical with or close to an output light of the local light source as a single frequency; a transmission/reception optical system that irradiates a pulsed laser beam from the pulsed laser toward a target as a transmission light and receives a scattered light from the target as a reception light; a light coupling means that couples the output light from the local light source and the reception light; a photo detecting portion that conducts light coherent detection on the light coupled by the light coupling means; and a signal processing device that calculates a speed and a distance of a target in accordance with an output from the photo detecting portion, characterized in that the photo detecting portion comprises: a photo detecting element that conducts the light coherent detection; a microwave switch that changes over a propagation path of an output from the photo detecting element; a microwave amplifier; and a switch control means that changes over the microwave switch so as to transmit a signal before a reference time to the signal processing device as a monitor signal and transmit a signal after the reference time to the signal processing device as a reception signal with a time at which the pulse light from the pulsed laser has completely passed through the transmission/reception optical system as the reference time.

Also, the pulsed laser includes an adjusting mechanism that adjusts a cavity length, the device further comprises a control circuit that controls the adjusting mechanism, and the control circuit outputs to the adjusting mechanism a control signal that adjusts the cavity length of the pulsed laser on the basis of an error signal from the signal processing device based on a frequency difference between the laser pulse and the local light.

Also, the microwave amplifier is made up of a pre-amplifier that amplifies a signal from the photo detecting element and a post-amplifier that amplifies an output of the pre-amplifier, and the microwave switch is disposed between the pre-amplifier and the post-amplifier, outputs a signal that has been amplified by the pre-amplifier as a monitor signal and outputs a signal that has passed through the post-amplifier as a reception signal.

Also, the microwave amplifier is made up of a pre-amplifier that amplifies a signal from the photo detecting element and a post-amplifier that amplifies an output of the pre-amplifier, and the microwave switch is disposed between the photo detecting element and the pre-amplifier, outputs a signal from the photo detecting element as a monitor signal and outputs a signal that has passed through the post-amplifier as a reception signal.

Also, according to another aspect of the present invention, there is provided a coherent laser radar device, comprising: a local light source that oscillates at a single frequency; a pulsed laser that oscillates at a frequency which is identical with or close to an output light of the local light source as a single frequency; a transmission/reception optical system that irradiates a pulsed laser beam from the pulsed laser toward a target as a transmission light and receives a scattered light from the target as a reception light; a light coupling means that couples the output light from the local light source and the reception light; a photo detecting portion that conducts light coherent detection on the light coupled by the light coupling means; and a signal processing device that detects a speed and a distance of a target in accordance with an output from the photo detecting portion, characterized in that the photo detecting portion comprises: a photo detecting element that conducts the light coherent detection; a microwave amplifying portion that amplifies an output signal from the photo detecting element; and a gain control means that controls the gain of the microwave amplifying portion so that an amplitude of the output signal from the microwave amplifying portion does not exceed a given threshold value.

Also, the pulsed laser includes an adjusting mechanism that adjusts a cavity length; the device further comprises a control circuit that controls the adjusting mechanism, and the control circuit outputs to the adjusting mechanism a control signal that adjusts the cavity length of the pulsed laser on the basis of an error signal from the signal processing device based on a frequency difference between the laser pulse and the local light.

Also, the microwave amplifier is made up of a pre-amplifier that amplifies a signal from the photo detecting element and a gain control amplifier that amplifies an output of the pre-amplifier, and the gain control means controls the gain of the gain control amplifier.

Also, the microwave amplifier is made up of a pre-amplifier that amplifies a signal from the photo detecting element and a post-amplifier that amplifies an output of the pre-amplifier, and the gain control means comprises a microwave variable attenuator disposed between the pre-amplifier and the post-amplifier, and an attenuation control circuit that controls the attenuation of the microwave variable attenuator.

Also, a coherent laser radar device according to still another aspect of the present invention is characterized by comprising: a local light source that oscillates at a single frequency; a pulsed laser that oscillates at a frequency which is identical with or close to an output light of the local light source as a single frequency; a transmission/reception optical system that irradiates a pulsed laser beam from the pulsed laser toward a target as a transmission light and receives a scattered light from the target as a reception light; a light coupling means that couples the output light from the local light source and the reception light; a photo detecting portion that conducts light coherent detection on the light coupled by the optical coupler; and a signal processing device that detects a speed and a distance of a target in accordance with an output from the photo detecting portion; a light variable attenuator disposed between the transmission/reception optical system and the photo detecting portion; and a control means that controls the attenuation of the light variable attenuator in such a manner that an amplitude of the output from the photo detecting portion does not exceed a given threshold value.

Further, the pulsed laser includes an adjusting mechanism that adjusts a cavity length, the device further comprises a control circuit that controls the adjusting mechanism, and the control circuit outputs to the adjusting mechanism a control signal that adjusts the cavity length of the pulsed laser on the basis of an error signal from the signal processing device based on a frequency difference between the laser pulse and the local light.

BRIEF DESCRIPTION OF THE DRAWINGS

FIG. 14 is a block diagram showing the structure of a signal processing device 16b as an example of a signal processing device 16 in the conventional example.

BEST MODES FOR CARRYING OUT THE INVENTION

First Embodiment

Figure 1:
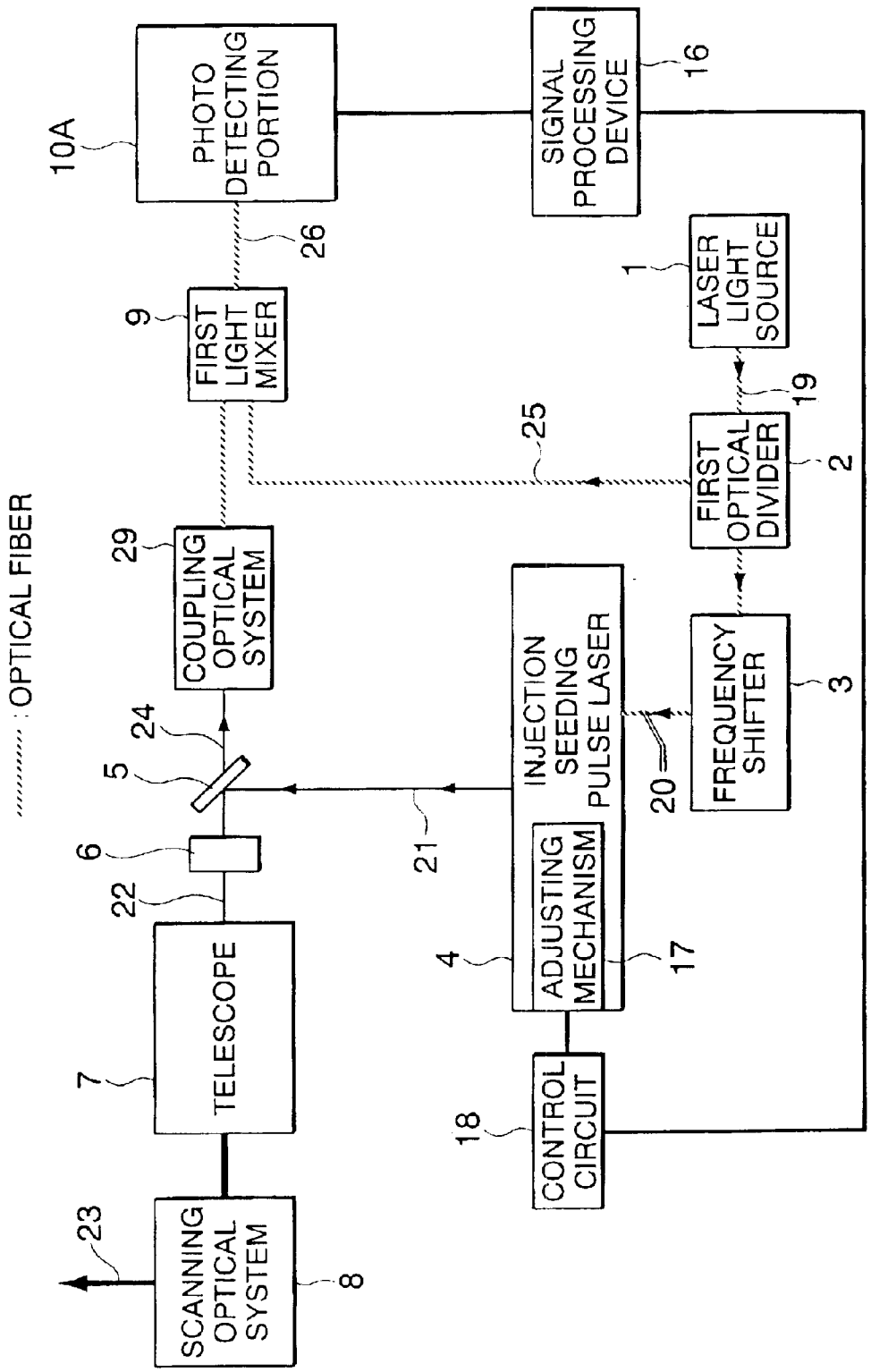
FIG. 1 is a block diagram showing a structure of a coherent laser radar device in accordance with a first embodiment of the present invention.
Figure 9:
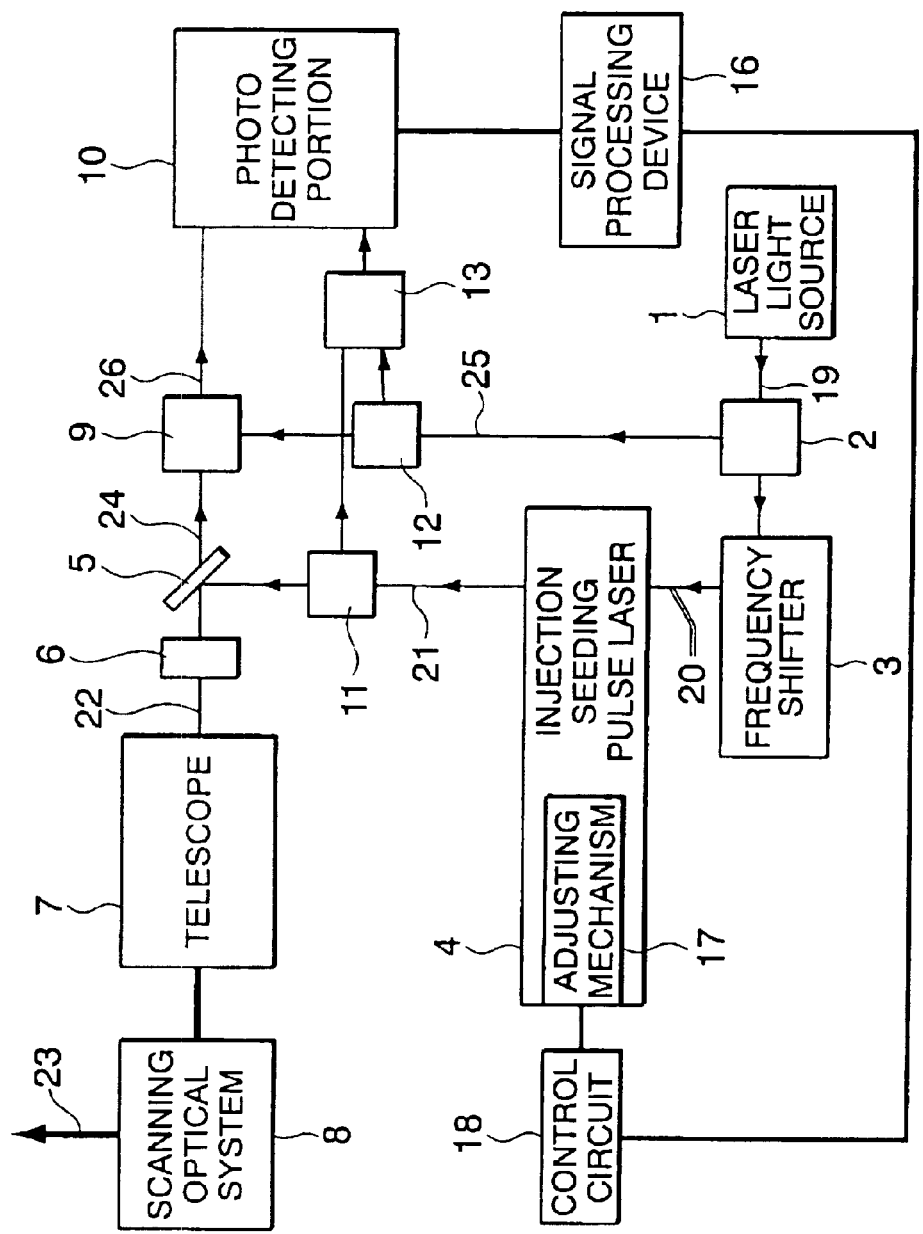
FIG. 9 is a block diagram showing a structure of a laser radar device in which a coherent laser radar device using an injection seeding pulsed laser device as a light source as disclosed in U.S. Pat. No. 5,237,331 B is combined with a wavelength synchronizing circuit for stabilizing the wavelength of a laser radar light source as disclosed in JP 10-54760 A.
Figure 10:
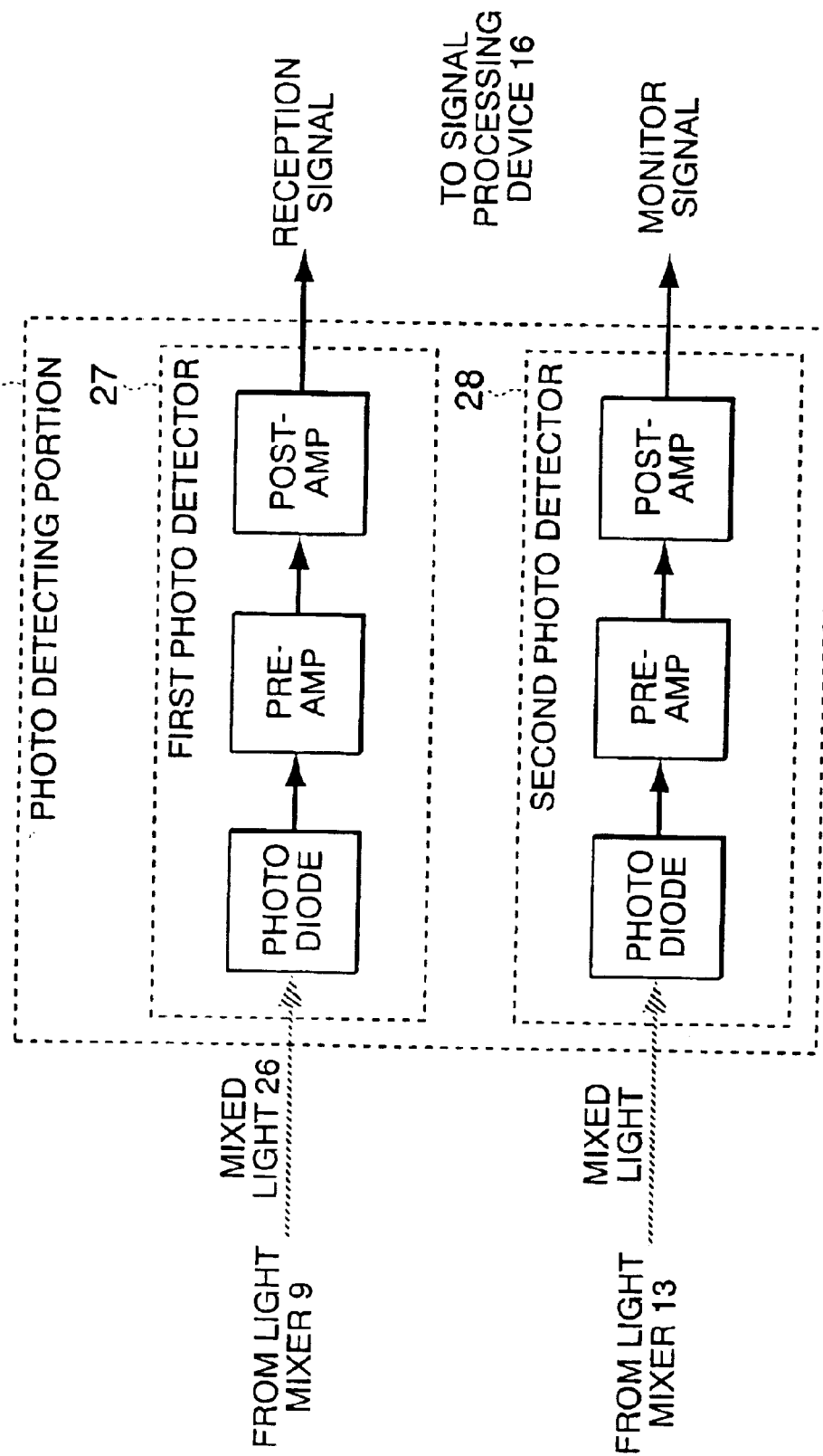
FIG. 10 is a block diagram showing a structure of a photo detecting portion 10a in accordance with a conventional example.

FIG. 1 is a block diagram showing a structure of a coherent laser radar device in accordance with a first embodiment of the present invention. In FIG. 1, the same parts as those in the conventional example shown in FIG. 9 are designated by like reference numerals and their description will be omitted.

In the coherent laser radar device shown in FIG. 1, differences from the conventional example shown in FIG. 9 will be described. First, there is disposed a photo detecting portion 10A that is different in the internal structure from the conventional example as will be described later. Also, there is disposed a coupling optical system 29 between the beam splitter 5 and the first optical coupler 9. In addition, the laser light source 1, the first optical divider 2, the frequency shifter 3 and the injection seeding pulsed laser 4 are connected to each other in the stated order by optical fibers, the first optical divider 2 and the first optical coupler 9 are connected to each other by an optical fiber, and the coupling optical system 29, the first optical coupler 9 and the photo detecting portion 10A of the first embodiment are connected to each other by optical fibers in the stated order. Then, the reception light 24 is coupled to the optical fiber by the coupling optical system 29 and then coupled with the local light 25 in the fiber inline type optical coupler 9. The coupled light 26 consisting of the reception light 24 and the local light 25 passes through the optical fiber and are then supplied to the photo detecting portion 10A.

Figure 11:
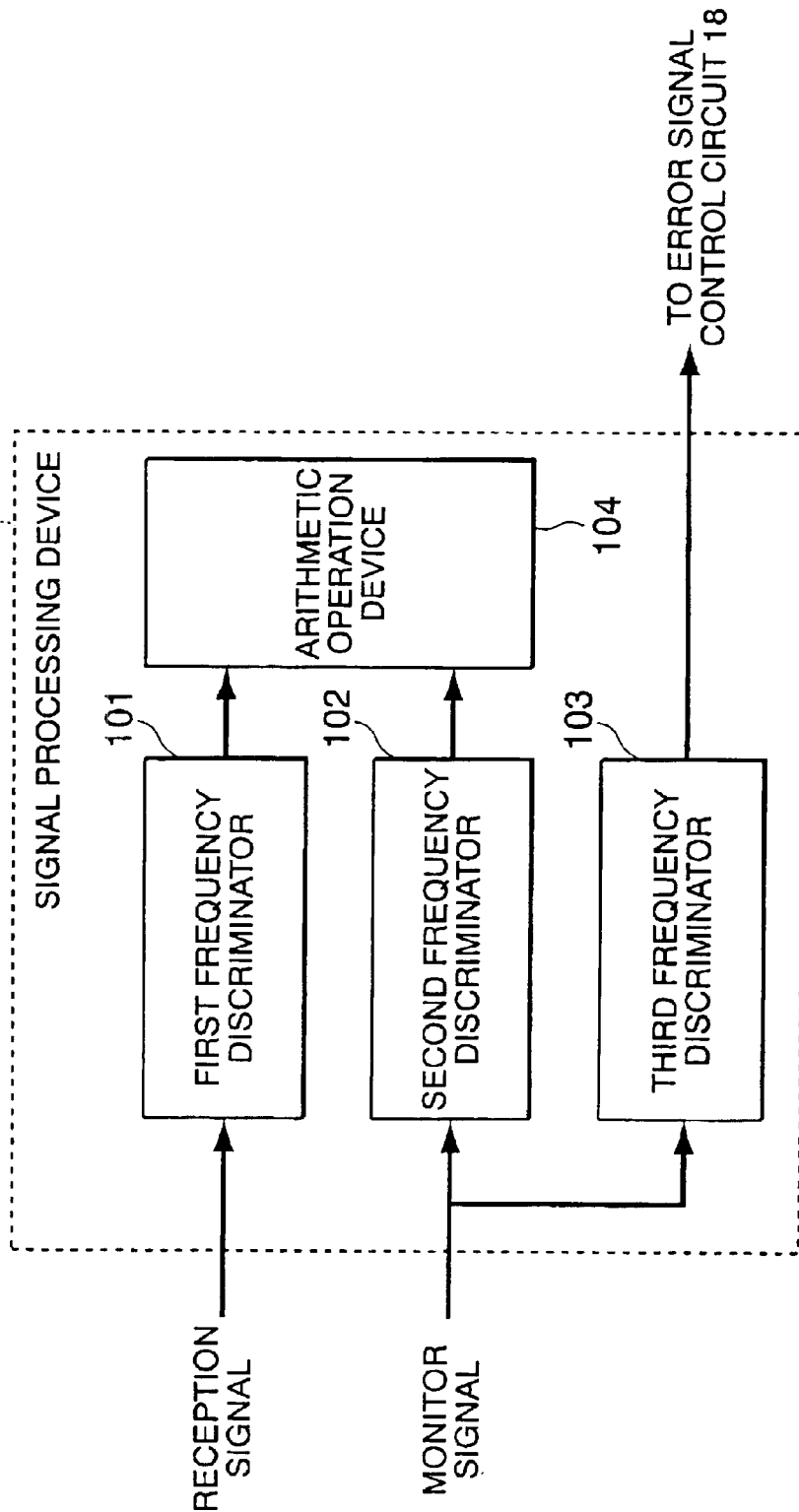
FIG. 11 is a block diagram showing a structure of a signal processing device 16a as an example of a signal processing device 16 in accordance with a conventional example.
Figure 12:
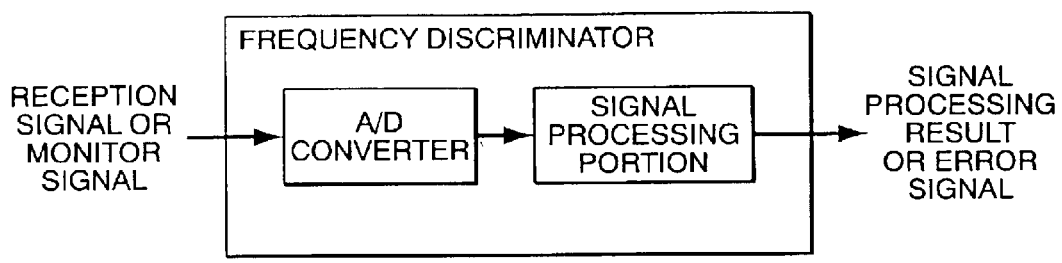
FIG. 12 is a block diagram showing an example of a structure of a frequency discriminator in FIG. 11.
Figure 13:
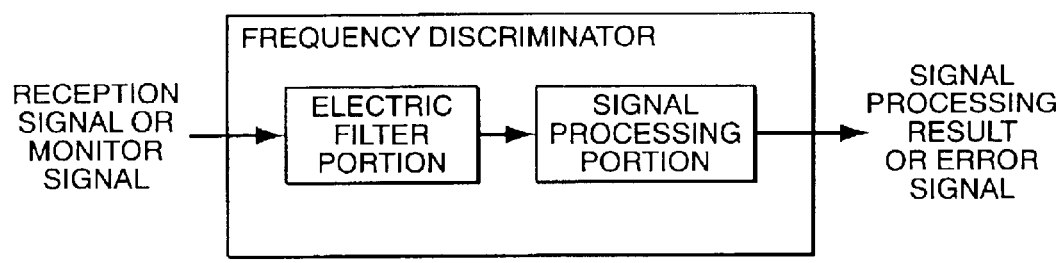
FIG. 13 is a block diagram showing another example of the structure of the frequency discriminator in FIG. 11.

On the other hand, the same portions as those in the conventional example shown in FIG. 9 will be described. A process that the injection seeding pulsed laser (hereinafter simply referred to as pulsed laser) 4 oscillates at a single frequency and a process that an output laser pulse from the injection seeding pulsed laser is transmitted toward a target as a transmission light and a scattered light from the target is received are identical with those in the conventional example shown in FIG. 9. Also, a process from supplying of the monitor signal and the reception signal to the signal processing device 16 from the photo detecting portion 10A of the first embodiment to the signal processing in the signal processing device 16 are also identical with those in the conventional example shown in FIG. 9. The signal processing device 16 may be structured by the signal processing device 16a shown in FIG. 11 or the signal processing device 16b shown in FIG. 14.

Figure 2:
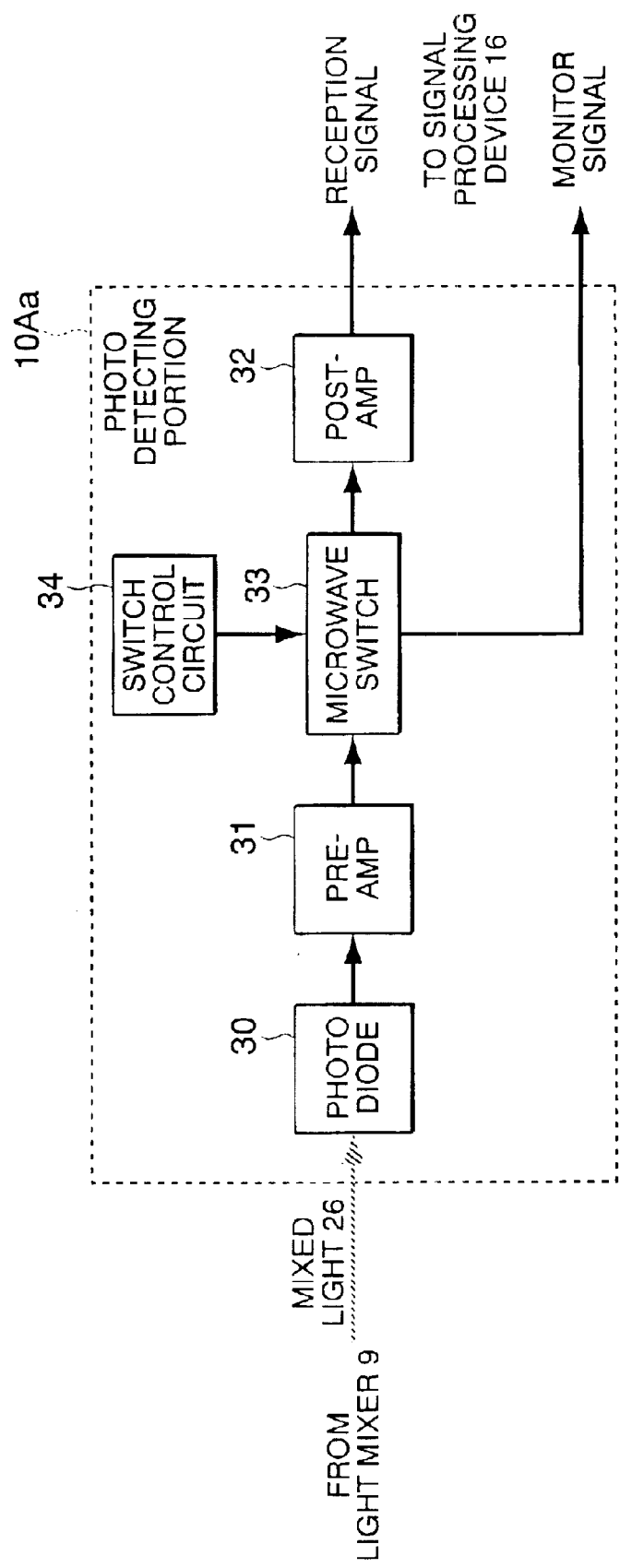
FIG. 2 is a block diagram showing a structure of a photo detecting portion 10Aa employed as a photo detecting portion 10A in the first embodiment of the present invention.

FIG. 2 is a block diagram showing a structure of a photo detecting portion 10Aa employed as a photo detecting portion 10A in the first embodiment of the present invention. The photo detecting portion 10Aa shown in FIG. 2 is made up of a photodiode 30, a pre-amplifier 31, a post-amplifier 32, a microwave switch 33 and a switch control circuit 34 that controls the microwave switch 33.

The microwave switch 33 is controlled by the switch control circuit 34 as follows. While an internal reflection light is received from the transmission/reception optical system to the photodiode 30 before the pulsed laser 4 oscillates, the microwave switch 33 transmits a signal from the photodiode 30 which has been amplified by the pre-amplifier 31 to the signal processing device 16 as the monitor signal. After the internal reflection light has been sufficiently attenuated, the microwave switch 33 transmits a signal from the photodiode 30 to the signal processing device 16 through the post-amplifier 32 as the reception signal. That is, the switch control circuit 34 changes over the microwave switch so as to transmit a signal before a reference time to the signal processing device 16 as the monitor signal and transmit a signal after the reference time to the signal processing device 16 as the reception signal with a time at which the pulse light from the pulsed laser 4 has completely passed through the transmission/reception optical system as the reference time.

Since the internal reflection light is also a part of the output laser pulse of the pulsed laser 4, the light coherent detection signal can be employed as a monitor signal for obtaining the frequency difference between the laser pulse 21 and the local light 25 and the oscillation timing of the laser pulse. The microwave switch 33 changes over after the internal reflection light has been sufficiently attenuated, thereby being capable of transmitting the reception signal without saturating the post-amplifier 32.

In addition, if a timing at which the microwave switch 33 changes over is a time point at which a signal resulting from the internal reflection light is attenuated to the degree at which the post-amplifier 32 is not saturated, the "blind zone" can be reduced. For example, if the pulse width of the laser pulse 21 is 200 ns, it is possible to set the change-over timing to 1 $\mu$s or less after oscillation. That is, the "blind zone" can be reduced to 150 m or less.

Figure 3:
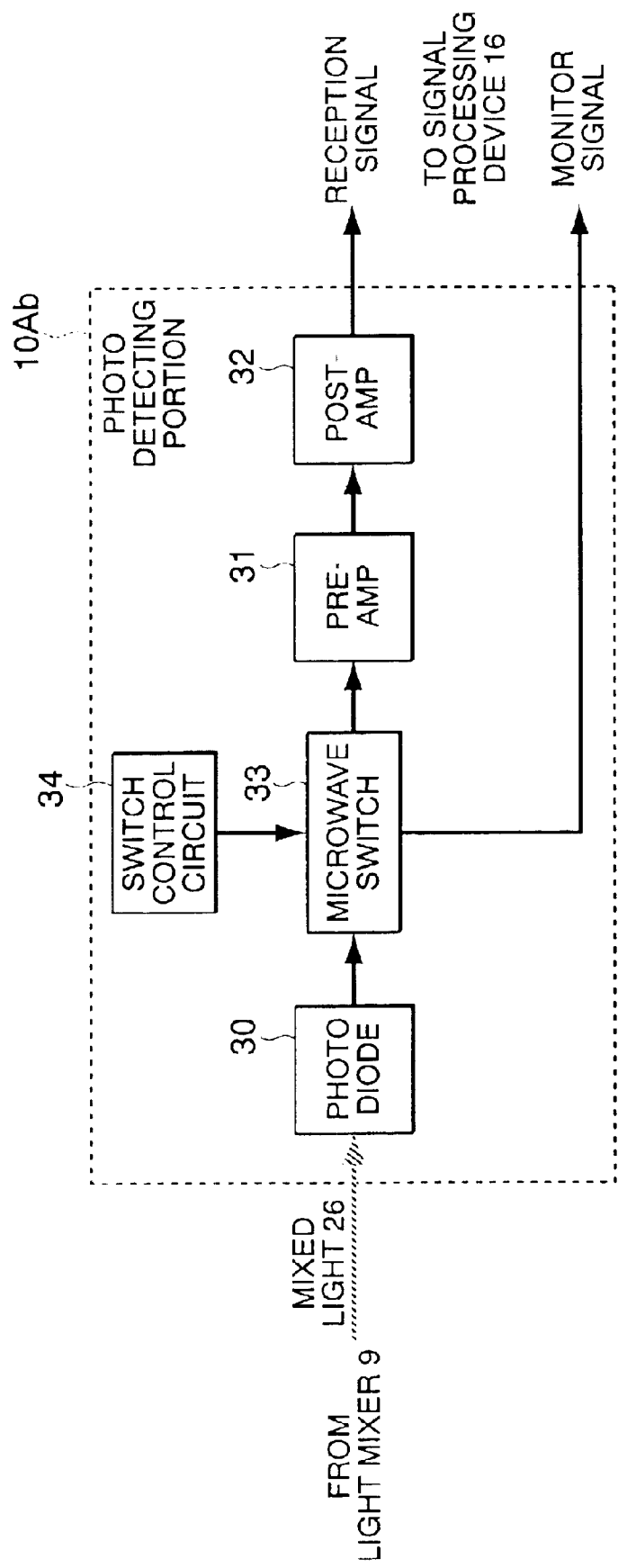
FIG. 3 is a block diagram showing a structure of a photo detecting portion 10Ab employed as a photo detecting portion 10A in the first embodiment of the present invention.

If the peak intensity of the internal reflection light is sufficiently high, the microwave switch 33 may be disposed between the photodiode 30 and the pre-amplifier 31 as in the photo detecting portion 10Ab shown in FIG. 3. In this situation, the timing at which the microwave switch 33 changes over is a point of time where the internal reflection light attenuates to the degree at which the pre-amplifier 31 and the post-amplifier 32 are not saturated.

The microwave switch 33 is required to provide the switching speed of about 0.1 $\mu$s and sufficient In-Out isolation that does not saturate the amplifier when the signal is off. However, in a semiconductor switch using GaAs or the like, the switch speed of 10 ns and the In-Out isolation of 40 dB or more are realized, and the microwave switch 33 can be formed of the semiconductor switch.

Since the above-mentioned structure makes it possible that the microwave switch 33 changes over to produce the monitor signal by using the internal reflection light, it is unnecessary to additionally provide an optical system for extracting a part of the laser pulse 24 and a photo detector for producing the monitor signal with the result that the device can be simplified. Also, the "blind zone" can be reduced by the change-over timing of the microwave switch 33 without saturating the pre-amplifier 31 and the post-amplifier 32.

Second Embodiment

Figure 4:
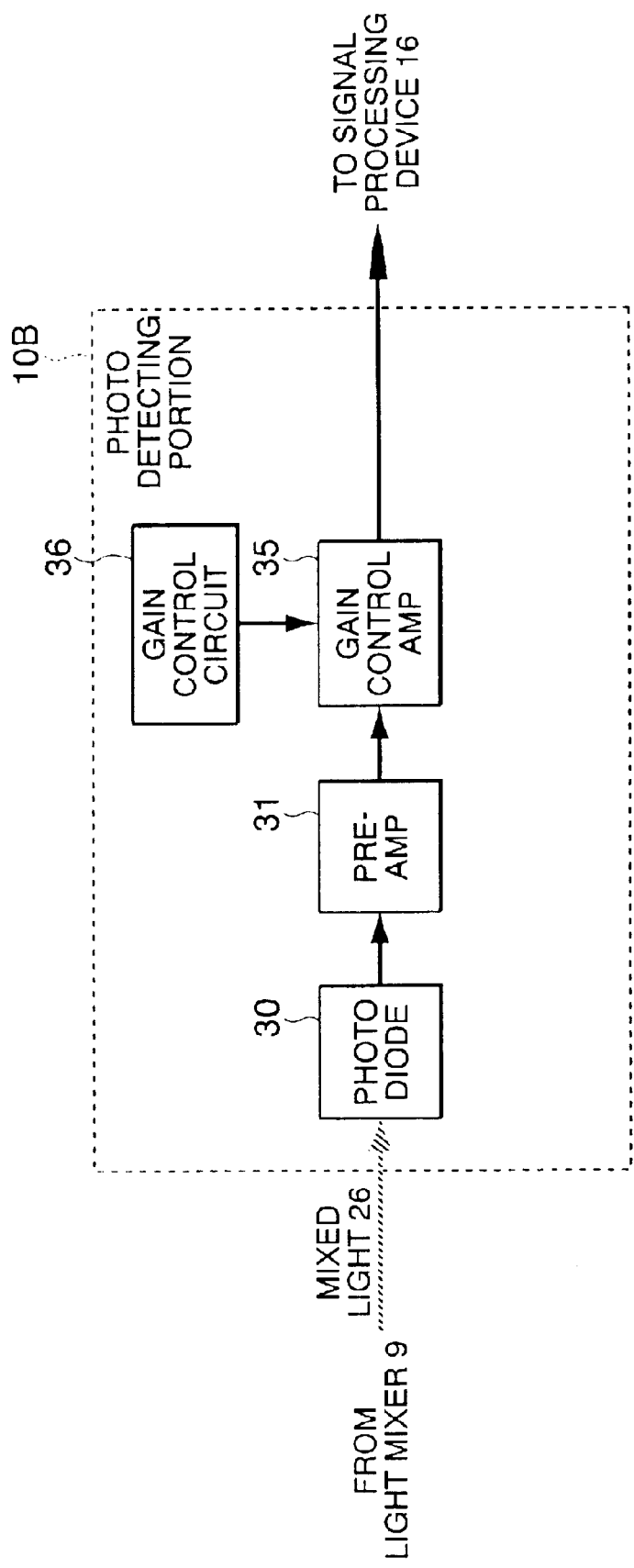
FIG. 4 is a block diagram showing a structure of a photo detecting portion 10B in accordance with a second embodiment of the present invention.

FIG. 4 is a block diagram showing a structure of a photo detecting portion 10B in accordance with a second embodiment of the present invention. The photo detecting portion 10B in the second embodiment of the present invention is employed instead of the photo detecting portion 10A according to the first embodiment in FIG. 1 and includes a photodiode 30, a pre-amplifier 31, a gain control amplifier 35 and a gain control circuit 36 that controls the gain of the gain control amplifier 35.

The pre-amplifier 31 and the gain control amplifier 35 structure the microwave amplifier in the photo detecting portion 10B, and the gain control amplifier 35 and the gain control circuit 36 structure the gain control means of the microwave amplifier.

Figure 5:
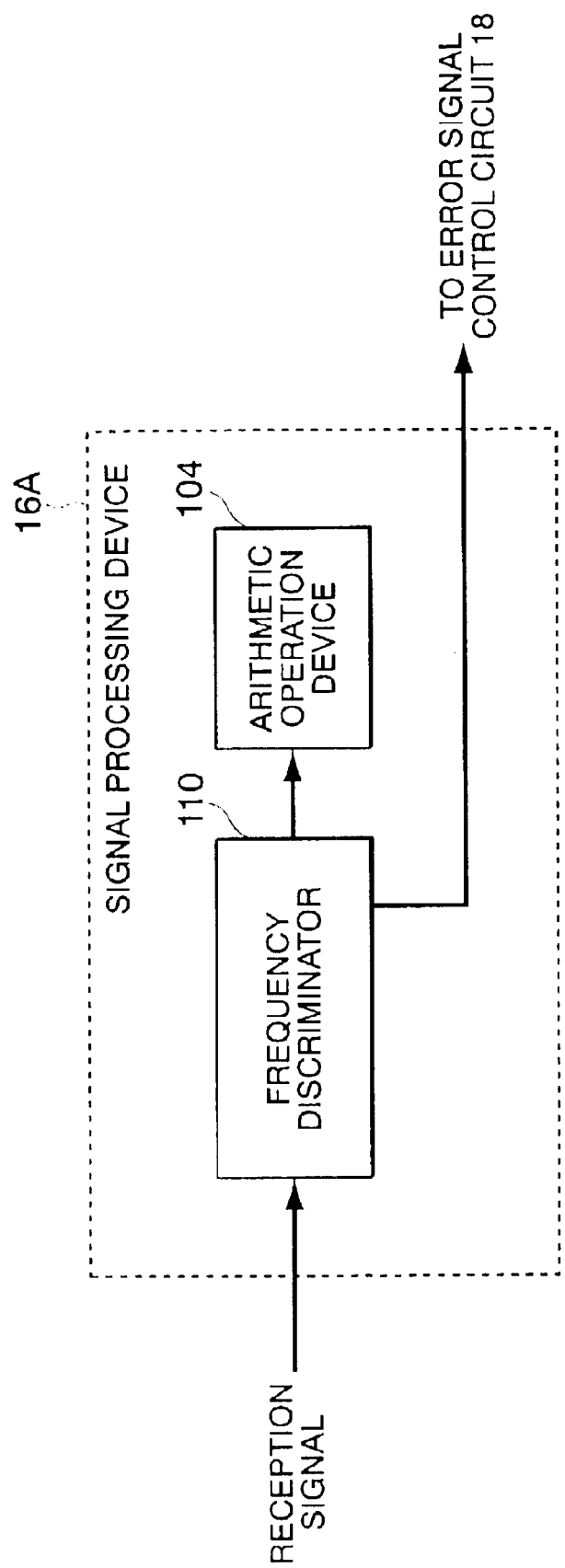
FIG. 5 is a block diagram showing a structure of a signal processing device 16A used as a signal processing device 16 in accordance with the second embodiment of the present invention.

Also, FIG. 5 is a block diagram showing a signal processing device 16A used as a signal processing device 16 in accordance with the second embodiment of the present invention. Since the signal processing device 16A in the second embodiment of the present invention is employed also as the signal processing device 16 shown in FIG. 1, the signal processing device 16A is made up of only a frequency discriminator 110 and an arithmetic operation device 104.

In the second embodiment, a process that the injection seeding pulsed laser 4 oscillates at a single frequency and a process that an output laser pulse from the injection seeding pulsed laser is transmitted toward a target as a transmission light and a scattered light from the target is received and supplied to the photo detecting portion 10B are identical with those in the first embodiment. The second embodiment is characterized in that the gain of the microwave amplifier in the photo detecting portion 10B is controlled in accordance with a time. The gain of the microwave amplifier is set to be low so that the peak value of a signal amplitude resulting from the internal reflection light does not exceed the sampling maximum amplitude of the frequency discriminator 110 while the internal reflection light is received by the photodiode 30 from the transmission/reception optical system. Thereafter, after the internal reflection light has been sufficiently attenuated, the gain of the microwave amplifier is set to a high gain sufficient to amplify the reception signal to the degree suitable for the sampling maximum amplitude of the frequency discriminator 110.

As described above, the gain of the microwave amplifier is controlled in such a manner that the monitor signal can enter a time zone of the reception signal which has not been conventionally used in the signal processing as the "blind zone". Since the monitor signal and the reception signal are allowed to flow in one signal line in a time division manner, two systems of the photo detectors and the frequency discriminators which have been required as the reception signal and the monitor signal up to now can be simplified into one system. In addition, there is advantageous in that the "blind zone" can be reduced due to the change-over timing of the gain of the microwave amplifier as in the first embodiment.

The above-mentioned structures make it possible to obtain an advantage that two systems of the photo detectors and the frequency discriminators which have been required as the reception signal and the monitor signal up to now can be simplified into one system and an advantage that the "blind zone" can be reduced due to the change-over timing of the gain of the microwave amplifier as in the first embodiment.

Third Embodiment

Figure 6:
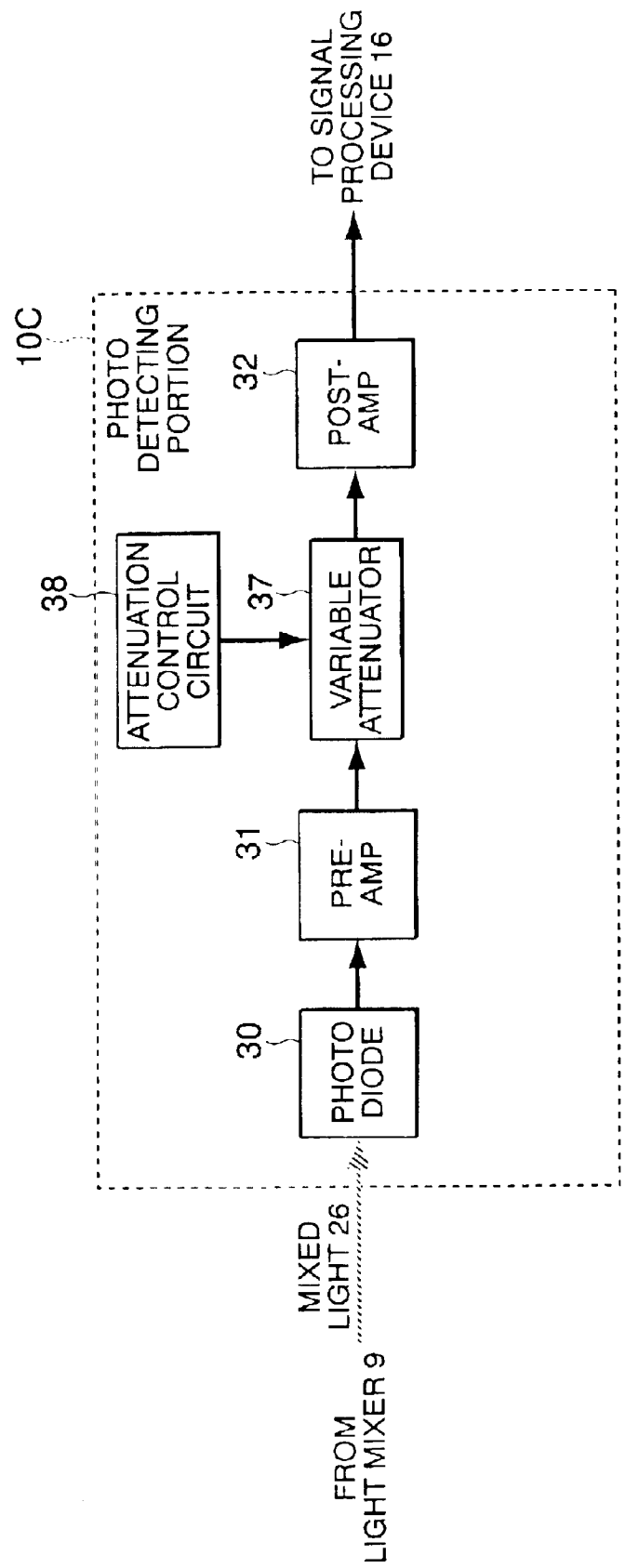
FIG. 6 is a block diagram showing a structure of a photo detecting portion 10C in accordance with a third embodiment of the present invention.

FIG. 6 is a block diagram showing a photo detecting portion 10C in accordance with a third embodiment of the present invention. The photo detecting portion 10C in the third embodiment of the present invention is used instead of the photo detecting portion 10A according to the first embodiment in FIG. 1 and includes a photodiode 30, a pre-amplifier 31, a post-amplifier 32, a microwave variable attenuator 37 and an attenuation control circuit 38 that controls the attenuation of the variable attenuator 37.

In other words, in the photo detecting portion 10C in the third embodiment, the microwave variable attenuator 37 is inserted between the pre-amplifier 31 and the post-amplifier 32 to structure the microwave amplifier of the photo detector. Then, the attenuation control circuit 38 controls the attenuation of the variable attenuator 37.

As a result, the monitor signal and the reception signal are allowed to flow in one output signal line in a time division manner.

The signal processing device 16 in the third embodiment of the present invention employs the same signal processing device 16A as that in the second embodiment shown in FIG. 5.

The above-mentioned structure makes it possible to obtain an advantage that two systems of the photo detectors and the frequency discriminators which have been required as the reception signal and the monitor signal up to now can be simplified into one system and an advantage that the "blind zone" can be reduced due to the change-over timing of the gain of the microwave amplifier as in the first embodiment.

The variable attenuator 37 can be formed of a semiconductor switch using GaAs or the like.

Fourth Embodiment

Figure 7:
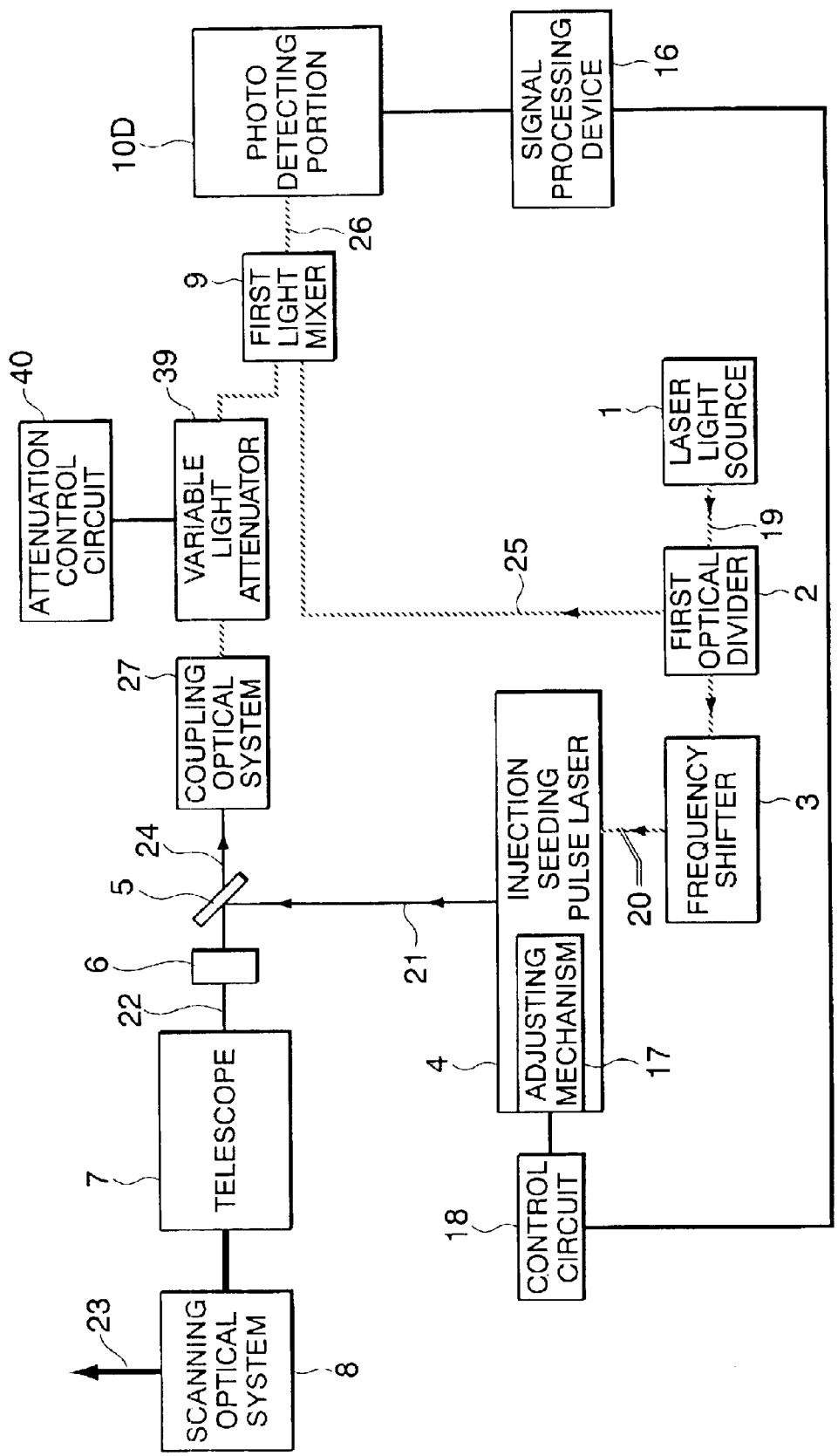
FIG. 7 is a block diagram showing a structure of a coherent laser radar device in accordance with a fourth embodiment of the present invention.

FIG. 7 is a block diagram showing the structure of a coherent laser radar device in accordance with a fourth embodiment of the present invention. In FIG. 7, the same parts as those in the first embodiment shown in FIG. 1 are designated by like references and their description will be omitted. In the coherent laser radar device according to the fourth embodiment, a variable light attenuator 39 and an attenuation control circuit 40 that controls the attenuation of the variable light attenuator 39 are further disposed between the coupling optical system 27 and the first optical coupler 9 with respect to the first embodiment shown in FIG. 1, as shown in FIG. 7. Also, there is disposed a photo detecting portion 10D different in the internal structure from those in the first to third embodiments as will be described later. The signal processing device 16 in the fourth embodiment of the present invention is formed of a signal processing device 16A like to that in the second embodiment shown in FIG. 5.

Figure 8:
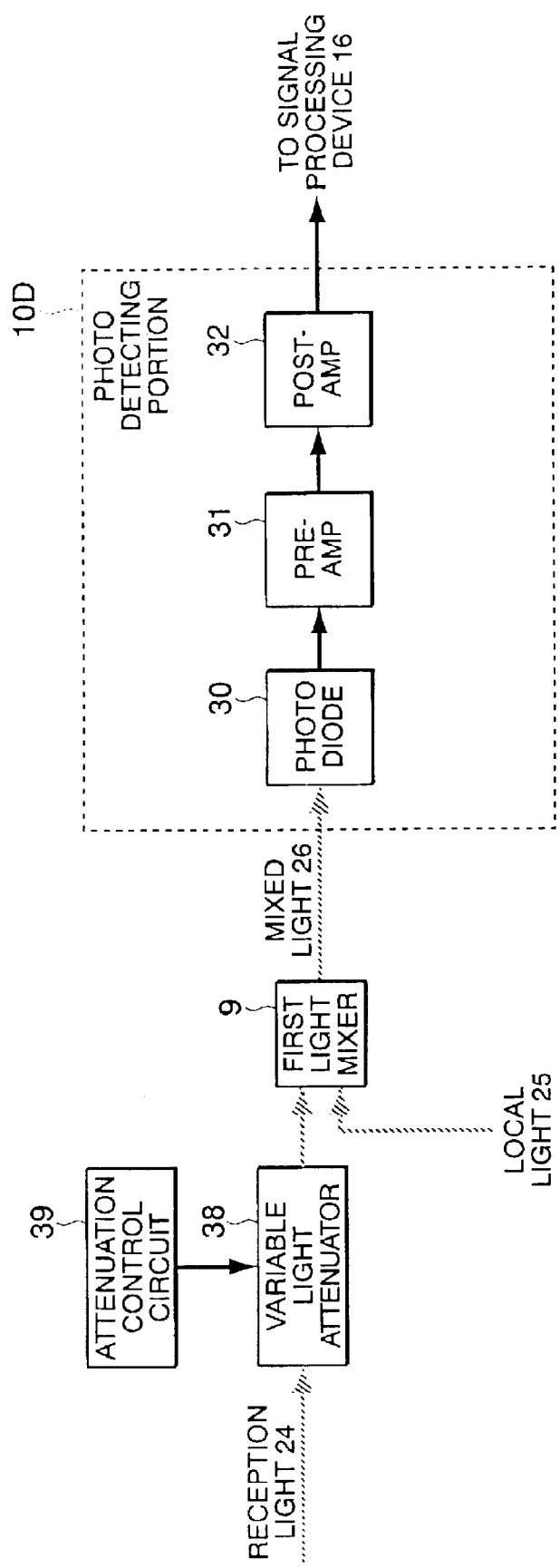
FIG. 8 is a block diagram showing a structure of a photo detecting portion 10D and an optical system immediately in front of the photo detecting portion 10D in the fourth embodiment of the present invention.

FIG. 8 is a block diagram showing the structure of a photo detecting portion 10D and an optical system immediately in front of the photo detecting portion 10D in the fourth embodiment of the present invention.

As shown in FIG. 8, in the fourth embodiment, the photo detecting portion 10D structures a pair of photo detectors formed of the combination of a photodiode 30 that is a photo detecting element which conducts coherent detection with a microwave amplifier which is formed of a pre-amplifier 31 and a post-amplifier 32 and has a fixed gain.

In this embodiment, the function of the structure of the second embodiment shown in FIGS. 4 and 5 is achieved by controlling the attenuation of the reception light 24 by the variable light attenuator 39 and the attenuation control circuit 40. That is, in the second embodiment, the function with which an output signal from the photo detector 10B to the signal processing device 16B does not exceed the sampling maximum amplitude of the frequency discriminator 110 by the gain control circuit 36 of the microwave amplifier in the photo detector 10B even while the internal reflection light is received by the photodiode 30 from the transmission/reception optical system is achieved by controlling the attenuation of the reception light 24 by the variable light attenuator 39 and the attenuation control circuit 40.

The attenuation of the variable light attenuator 39 is set to be high so that a peak value of a signal amplitude resulting from the internal reflection light does not exceed the sampling maximum amplitude of the frequency discriminator 110 shown in FIG. 5 while the internal reflection light is received by the photodiode 30 shown in FIG. 8 from the transmission/reception optical system, to thereby limit the power of the internal reflection light received by the photodiode 30. Thereafter, the internal reflection light has been sufficiently attenuated, control is then made in such a manner that the attenuation of the variable light attenuator 39 is set to 0 or nearly 0, and the power loss of the reception light which is received by the photodiode 30 is lowered. The gain of the microwave amplifier is set to sufficient high to amplify the reception signal at that time to the degree suitable for the sampling maximum amplitude of the frequency discriminator 110.

As described above, the attenuation of the variable light attenuator 39 is controlled, to thereby make it possible that the monitor signal enters the time zone of the reception signal that has not been conventionally used in the signal processing as the "blind zone" as in the second embodiment. Since the monitor signal and the reception signal are allowed to flow in one signal line in a time division manner, two systems of the photo detectors and the frequency discriminators which have been required as the reception signal and the monitor signal up to now can be simplified into one system. In addition, there is advantageous in that the "blind zone" can be reduced due to the change-over timing of the gain of the microwave amplifier as in the second embodiment.

The above-mentioned structure makes it possible to obtain an advantage that two systems of the photo detectors and the frequency discriminators which have been required as the reception signal and the monitor signal up to now can be simplified into one system and an advantage that the "blind zone" can be reduced due to the change-over timing of the gain of the microwave amplifier as in the first embodiment.

The above-mentioned first to fourth embodiments show the structural examples in which the laser light source 1, the first optical divider 2, the frequency shifter 3 and the injection seeding pulsed laser 4 are coupled to each other by optical fibers in the stated order, respectively, the first optical divider 2 and the first optical coupler 9 are coupled to each other by an optical fiber, and the coupling optical system 29, the first optical coupler 9, the photo detecting portion 10 (10A, 10Aa, 10Ab, 10B, 10C, 10D) are coupled to each other by optical fibers in the stated order, respectively, so as to allow the local light 25, the reception light 24, the seed light 20 and the coupled light 26 to be propagated in the optical fiber.

The first to fourth embodiments may be structured in such a manner that all or a part of the coupling optical system 29 and the optical fiber are omitted as in the conventional example shown in FIG. 9, and all or a part of the local light 25, the reception light 24, the seed light 20 and the coupled light 26 are propagated into a space, and the same advantages as those described above can be obtained.

INDUSTRIAL APPLICABILITY

As was described above, according to the present invention, in the coherent laser radar device that uses the injection seeding pulsed laser as a light source and also uses the coaxial transmission/reception optical system, there can be obtained the coherent laser radar device which is capable of simplifying the photo detectors of two systems for the reception signal and the monitor signal into one system, and is also capable of reducing the blind zone.

What is claimed is:

1. A coherent laser radar device comprising:

a local light source that oscillates at a single frequency;

a pulsed laser that oscillates at a frequency which is identical with or close to the single frequency of said local light source;

a transmission/reception optical system that irradiates a pulsed laser beam from said pulsed laser toward a target as a transmission light and receives a scattered light from the target as a reception light;

a light coupling means that couples the output light from said local light source and said reception light;

a photo detecting portion that conducts light coherent detection on the light coupled by said light coupling means; and a signal processing device that calculates a speed and a distance of a target in accordance with an output from said photo detecting portion, characterized in that said photo detecting portion comprises:

a photo detecting element that conducts the light coherent detection;

a microwave switch that changes over a propagation path of an output from said photo detecting element;

a microwave amplifier; and a switch control means that changes over said microwave switch so as to transmit a signal before a reference time to said signal processing device as a monitor signal and transmit a signal after the reference time to said signal processing device as a reception signal with said reference time being a time at which the pulse light from said pulsed laser has completely passed through said transmission/reception optical system.

2. A coherent laser radar device according to claim 1, characterized in that:

said pulsed laser includes an adjusting mechanism that adjusts a cavity length;

said device further comprises a control circuit that controls said adjusting mechanism; and said control circuit outputs to said adjusting mechanism a control signal that adjusts the cavity length of said pulsed laser on the basis of an error signal from said signal processing device based on a frequency difference between the laser pulse and the local light.

3. A coherent laser radar device according to claim 1, characterized in that:

said microwave amplifier is made up of a pre-amplifier that amplifies a signal from said photo detecting element and a post-amplifier that amplifies an output of the pre-amplifier; and said microwave switch is disposed between said pre-amplifier and said post-amplifier, outputs a signal that has been amplified by said pre-amplifier as a monitor signal and outputs a signal that has passed through said post-amplifier as a reception signal.

4. A coherent laser radar device according to claim 1, characterized in that:

said microwave amplifier is made up of a pre-amplifier that amplifies a signal from said photo detecting element and a post-amplifier that amplifies an output of the pre-amplifier; and said microwave switch is disposed between said photo detecting element and said pre-amplifier, outputs a signal from said photo detecting element as a monitor signal and outputs a signal that has passed through said post-amplifier as a reception signal.

5. A coherent laser radar device comprising:

a local light source that oscillates at a single frequency;

a pulsed laser that oscillates at a frequency which is identical with or close to the single frequency of said local light source;

a transmission/reception optical system that irradiates a pulsed laser beam from said pulsed laser toward a target as a transmission light and receives a scattered light from the target as a reception light;

a coupling means that couples said reception light and an internal reflection light to an optical path, the internal reflection light comprising a part of the pulsed laser beam from said pulsed laser used for generating a monitor signal;

a photo detecting portion that conducts light coherent detection on the light coupled to the optical path by said light coupling means; and a signal processing device that calculates a speed and a distance of a target in accordance with an output from said photo detecting portion, characterized in that said photo detecting portion comprises:

a photo-detecting element that conducts the light coherent detection;

a microwave amplifying portion that amplifies an output signal from said photo detecting element; and a gain control means that controls the gain of said microwave amplifying portion so that an amplitude of the output signal from said microwave amplifying portion does not exceed a given threshold value.

6. A coherent laser radar device according to claim 5, characterized in that:

said pulsed laser includes an adjusting mechanism that adjusts a cavity length;

said device further comprises a control circuit that controls said adjusting mechanism; and said control circuit outputs to said adjusting mechanism a control signal that adjusts the cavity length of said pulsed laser on the basis of an error signal from said signal processing device based on a frequency difference between the laser pulse and the local light.

7. A coherent laser radar device according to claim 5, characterized in that:

said microwave amplifier is made up of a pre-amplifier that amplifies a signal from said photo detecting element and a gain control amplifier that amplifies an output of the pre-amplifier; and said gain control means controls the gain of said gain control amplifier.

8. A coherent laser radar device according to claim 5, characterized in that:

said microwave amplifier is made up of a pre-amplifier that amplifies a signal from said photo detecting element and a post-amplifier that amplifies an output of the pre-amplifier; and said gain control means comprises a microwave variable attenuator disposed between said pre-amplifier and said post-amplifier, and an attenuation control circuit that controls the attenuation of said microwave variable attenuator.

9. A coherent laser radar device characterized by comprising:

a local light source that oscillates at a single frequency;

a pulsed laser that oscillates at a frequency which is identical with or close to the single frequency of said local light source;

a transmission/reception optical system that irradiates a pulsed laser beam from said pulsed laser toward a target as a transmission light and receives a scattered light from the target as a reception light;

a coupling means that couples said reception light and an internal reflection light to an optical path, the internal reflection light comprising a part of the pulsed laser beam from said pulsed laser used for generating a monitor signal;

a photo detecting portion that conducts light coherent detection on the light coupled to the optical path by said optical coupler; and a signal processing device that detects a speed and a distance of a target in accordance with an output from said photo detecting portion;

a light variable attenuator disposed between said transmission/reception optical system and said photo detecting portion; and a control means that controls the attenuation of said light variable attenuator in such a manner that an amplitude of the output from said photo detecting portion does not exceed a given threshold value.

10. A coherent laser radar device according to claim 9, characterized in that:

said pulsed laser includes an adjusting mechanism that adjusts a cavity length;

said device further comprises a control circuit that controls said adjusting mechanism; and said control circuit outputs to said adjusting mechanism a control signal that adjusts the cavity length of said pulsed laser on the basis of an error signal from said signal processing device based on a frequency difference between the laser pulse and the local light.

11. An apparatus implemented in a laser radar device, the laser radar device being configured to transmit a pulsed laser beam toward a target and process scattered light received from the target in a signal processing unit, the apparatus comprising:

light coupling means for coupling the output light of a light source with the received scattered light, the light source being used to generate the pulsed laser beam;

photo-detecting means for generating a signal by performing coherent detection on the light coupled by the light coupling means;

outputting means for outputting the signal generated by the photo-detecting means to the signal processing unit as a monitor signal before a reference time, and for outputting an amplified version of the signal generated by the photo-detecting means to the signal processing unit as a reception signal after the reference time, wherein the reception signal is used by the signal processing unit to determine at least one of a speed and direction of the target, and the reference time corresponds to a time at which internal reflection signals of the laser radar device are diminished.

12. The apparatus of claim 11, wherein the monitoring signal is used by the laser radar device to adjust a frequency of the pulsed laser beam to be closer to a frequency of a seed light used for generating the pulsed laser beam.

13. The apparatus of claim 11, wherein the photo-detecting means include, a photo-detecting element that performs the coherent detection; and a pre-amplifier operable to generate a first amplified signal by amplifying an output of the photo-detecting element.

14. The apparatus of claim 13, wherein the photo-detecting means further include a post-amplifier operable to generate a second amplified signal by amplifying the first amplified signal, and the outputting means includes a microwave switch disposed between the preamplifier and the post amplifier, the microwave switch being operable to:

direct the first amplified signal to the signal processing unit as the monitoring signal before the reference time; and direct the first amplified signal to the post-amplifier after the reference time, thereby allowing the second amplified signal being output to the signal processing unit as the reception signal.

15. The apparatus of claim 11, wherein the outputting means include, a microwave amplifier operably connected to the photo-detecting means, and gain control means for controlling a gain of a signal output by the microwave amplifier.

16. The apparatus of claim 15, wherein the photo-detecting means include, a photo-detecting element that performs the coherent detection; and a pre-amplifier configured to generate an amplified signal by amplifying an output of the photo-detecting element, the amplified signal being sent to the outputting means.

17. The apparatus of claim 16, wherein the microwave amplifier is a gain control amplifier operably connected to receive the amplified signal output by the pre-amplifier, an output of the microwave amplifier further being directed to the signal processing unit, and the gain control means controls a gain of the gain control amplifier to increase after the reference time.

18. The apparatus of claim 16, wherein the gain control means is a microwave variable attenuator operably connected to receive the amplified signal output by the pre-amplifier, the microwave variable attenuator being controlled to attenuate the received amplified signal before the reference time, and the microwave amplifier is a post amplifier operably connected to receive an output of the microwave variable attenuator, an output of the post amplifier being directed to the signal processing unit.

19. The apparatus of claim 11, further comprising a light variable attenuator operably connected to transfer the received scattered light to the photo-detecting means, light variable attenuator being controlled to attenuate the received scattered light to a given threshold before the reference time.

20. A method in a laser radar device, the laser radar device being configured to transmit a pulsed laser beam toward a target and process scattered light received from the target in a signal processing unit, the method comprising:

coupling the output light of a light source with the received scattered light, the light source being used to generate the pulsed laser beam;

generating a first signal by performing coherent detection on the coupled light to generate a first signal;

outputting, before a reference time, the first signal to the signal processing unit as a monitor signal; and outputting, after the reference time, a second signal to the signal processing unit as a reception signal, the second signal being an amplified version of the first signal, wherein the reception signal is used by the signal processing unit to determine at least one of a speed and direction of the target, and the reference time corresponds to a time at which internal reflection signals of the laser radar device are diminished.

21. The method of claim 20, further comprising:

utilizing a pre-amplifier to amplify a signal generated by the coherent detection;

utilizing a post-amplifier to amplify an output of the pre-amplifier; and utilizing a microwave switch to perform the output steps, the microwave switch being configured to direct the output of the pre-amplifier to the signal processing unit before the reference time, and to direct an output of the post-amplifier to the signal processing unit after the reference time.

22. The method of claim 20, wherein the outputting steps are performed by a gain control amplifier configured to receive a signal generated as a result of the coherent detection, and the method further comprises:

controlling a gain of the gain control amplifier to increase after the reference time.

23. The method of claim 20, further comprising:

utilizing a microwave variable attenuator to attenuate a signal generated as a result of the coherent detection to a given threshold before the reference time, wherein the outputting steps are performed by a microwave amplifier configured to amplify an output of the microwave variable attenuator.

24. The method of claim 20, further comprising:

utilizing a light variable attenuator to attenuate the received scattered light to a given threshold before the reference time, wherein the coupling step couples an output of the light variable attenuator to the output light of the light source.

* * * * *